July 18, 1961

T. J. DOLPHIN ET AL 2,993,158

MOTOR VOLTAGE REGULATOR WITH ADJUSTABLE RATE CONTROL

Filed Nov. 21, 1957

WITNESSES

John E. Hurley Jr
Leon J. Jaja

INVENTORS
Thomas J. Dolphin &
Billy W. Roberts
BY
Paul E. Friedemann
ATTORNEY

July 18, 1961  T. J. DOLPHIN ET AL  2,993,158
MOTOR VOLTAGE REGULATOR WITH ADJUSTABLE RATE CONTROL
Filed Nov. 21, 1957  2 Sheets-Sheet 2

Generator Voltage (No Rate Limit)

Generator Voltage

Corresponding Rate of Change of Generator Voltage

Generator Voltage

Rate of Change of Generator Voltage

United States Patent Office 2,993,158
Patented July 18, 1961

2,993,158
MOTOR VOLTAGE REGULATOR WITH ADJUSTABLE RATE CONTROL
Thomas J. Dolphin, Cheektowaga, and Billy W. Roberts, Williamsville, N.Y., assignors to Westinghouse Electric Corporation, East Pittsburgh, Pa., a corporation of Pennsylvania
Filed Nov. 21, 1957, Ser. No. 697,968
5 Claims. (Cl. 318—143)

This invention relates to an electric system of control and more particularly to a variable voltage drive of the Ward-Leonard type.

In modern variable voltage drives of this type not only is the speed of the motor coupled to the generator controlled but also the rate of acceleration and rate of deceleration is controlled. For this acceleration control and deceleration control it has been common practice that the acceleration rate and deceleration rate, in a variable voltage drive of the type mentioned, be controlled by obtaining the reference signal to be supplied to the generator voltage regulator from a motor operated rheostat. In this arrangement the rate of change of voltage is adjusted by varying the speed of the motor operated rheostat. A sensitive relay and a bridge circuit is employed to position the rheostat and thus establish the operating point of the variable voltage drive. The disadvantage of this apparatus and method of procedure of the prior art is that both the rheostat and the sensitive relay used to position the rheostat are mechanical that are subject to wear and require maintenance. In applications where the drive must be accelerated and decelerated frequently, these mechanical components are subjected to a rather severe duty cycle and maintenance expense often becomes excessive.

It is a broad object of this invention to provide an improved acceleration and deceleration control in a variable voltage drive.

It is a specific object of this invention to provide in a variable voltage drive for controlling the rate of change in generator voltage in a linear manner without the use of a motor operated rheostat and without the use of a sensitive relay in a bridge circuit.

It is also an object of this invention to provide a system of control for a variable voltage drive that is completely static.

Another object of this invention is to provide magnetic amplifier means for controlling the speed and acceleration and deceleration of a motor in a variable voltage drive.

A further object of this invention is the provision of a system of control for a variable voltage drive that is completely static and in which the preset operating point as well as the rate of acceleration and the rate of deceleration are readily adjustable.

The objects recited are illustrative. Other objects and advantages will become more apparent from a study of the following specification and the accompanying drawings, in which.

Figure 1:
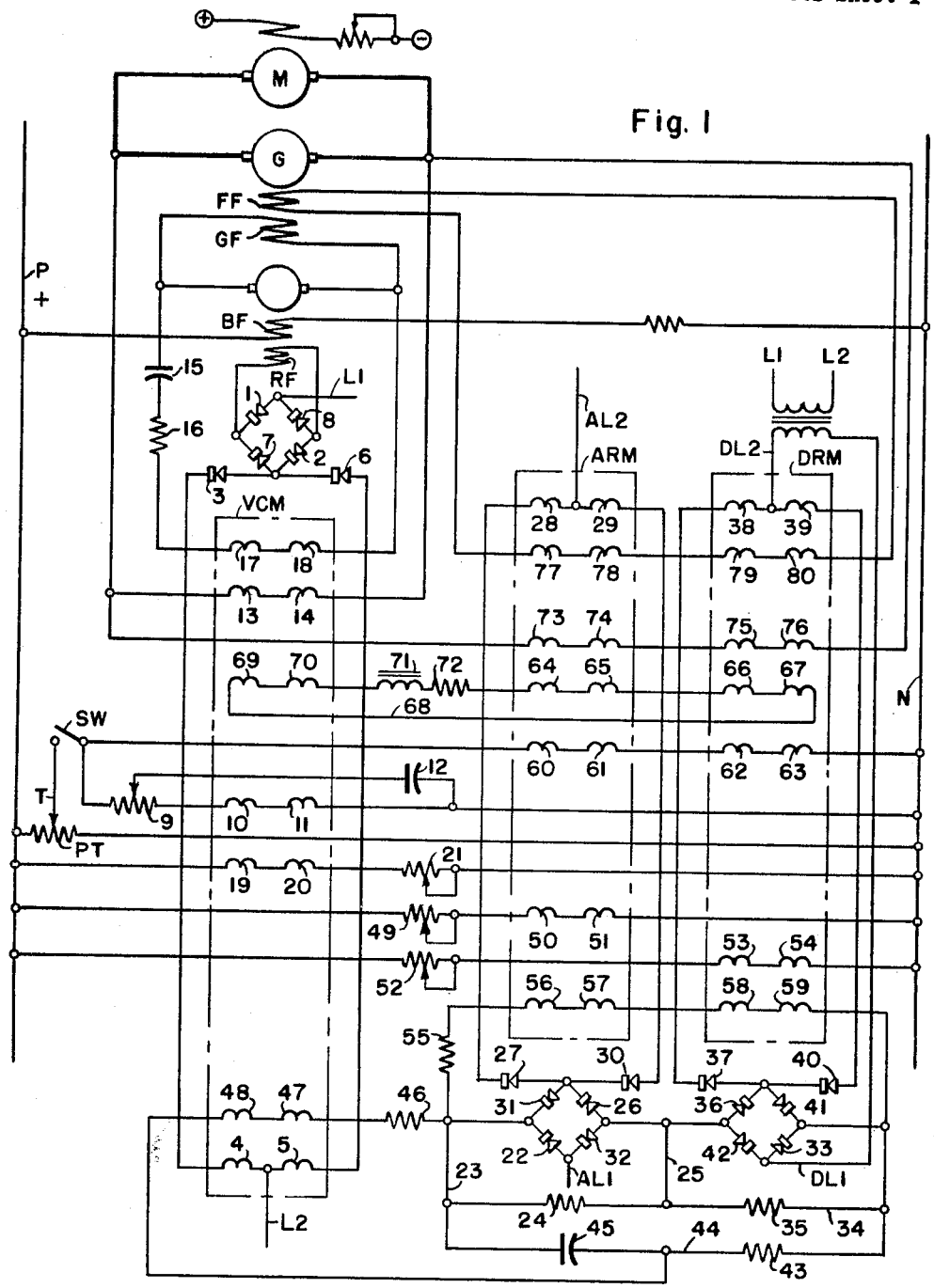
FIGURE 1 is a diagrammatic showing of the variable voltage drive and the static system of control therefor.

In this system the variable voltage drive includes the motor M and the generator G connected in a loop circuit as shown. The motor is excited at any selected constant valve, or at a variable value, by a suitable circuitry as shown. The generator G has a main generator field winding GF connected in a loop circuit with the armature of the exciter Exc.

The exciter Exc is provided with a bias field winding BF connected, through suitable rheostatic means not shown in detail, across the positive and negative leads P and N. The exciter also has a regulating field winding RF supplied with a regulated current from the voltage control magnetic amplifier VCM. The circuit for this regulating field winding RF may be traced from lead L1, when lead L1 is positive, through a rectifier 1, the regulating field winding RF, the rectifiers 2 and 3, the main magnetic amplifier winding 4 to lead L2. When L2 is positive the circuit is through the main winding 5, rectifiers 6 and 7, the regulating field winding RF and rectifier 8 to lead L1. The output of this magnetic amplifier VCM, and thus the exciting current in field winding RF is determined by the control windings of the magnetic amplifier VCM.

This disclosure provides apparatus for modifying the response of the generator voltage for large changes of the reference signal to provide independently adjustable acceleration and deceleration rates of the variable voltage drive. The voltage regulator of this variable voltage drive thus consists essentially, among other elements, of a generator exciter Exc and a magnetic amplifier connected in cascade.

The pattern winding of the magnetic amplifier VCM is connected to leads P and N through the run switch SW and the manually adjustable tap T on the potentiometer PT, which is connected directly across leads P and N. The adjustment of tap T determines the operating point of the drive. The circuit for the pattern windings may be traced from tap T through the run switch SW, resistor 9, pattern windings 10 and 11 to negative lead N. The resistor 9 and capacitor 12 constitute an RC circuit connected around the pattern windings 10 and 11. The utility of this RC circuit will become more apparent as the description proceeds.

The magnetic amplifier VCM also has generator voltage responsive windings 13 and 14 as shown connected directly across the output leads of the generator G. The effect of the voltage responsive windings 13 and 14 is matched against the effect of the pattern windings 10 and 11 to maintain the generator voltage in correspondence with the setting of tap T. The rate damping circuit, including the series circuit consisting of capacitor 15, resistor 16 and windings 17 and 18 connected across the exciter armature leads, and the bias winding circuit, including the series circuit consisting of bias windings 19 and 20 and rheostat 21, complete the circuit for the voltage regulating feature of this control.

However, this system of control does more than regulate voltage. The rate of change of generator voltage is measured by means of a flux field winding FF on the variable voltage generator G. The rate limit control approximates a 10% field and provides a rate signal to the push pull rate limit magnetic amplifiers ARM and DRM.

Magnetic amplifier ARM is the acceleration rate limiting magnetic amplifier and magnetic amplifier DRM is the deceleration rate limiting magnetic amplifier.

The main or output circuit for magnetic amplifier ARM may be traced from lead AL1, when AL1 is positive, through rectifier 22, conductor 23, load resistor 24, conductor 25, rectifiers 26 and 27, main windings 28 to lead AL2. When lead AL2 is positive, the circuit may be traced from lead AL2 through main winding 29, rectifiers 30 and 31, conductor 23, load resistor 24, conductor 25, and rectifier 32 to lead AL1.

The supply leads DL1 and DL2 for the magnetic amplifier DRM are energized from leads L1 and L2 through the isolation transformer IT. When lead DL1 is positive the circuit may be traced from lead DL1 through rectifier 33, conductor 34, load resistor 35, conductor 25, rectifiers 36 and 37, main winding 38 to lead DL2. When lead DL2 is positive the circuit is from lead DL2 through main winding 39, rectifiers 40 and 41, conductor 34, load resistor 35, conductor 25, and rectifier 42 to lead DL1.

From the foregoing it is apparent that a push pull voltage from the two outputs of the magnetic amplifiers ARM and DRM appears across the load resistor 24 and 35, that is the magnitude of the effective voltage appearing across conductors 23 and 34 is determined by the magnitude of the difference in voltage output between the two magnetic amplifiers and the polarity of this voltage is determined by the sign of the voltage difference.

To provide a ripple free direct current output from the magnetic amplifiers the resistor 43, conductor 44 and capacitor 45 are connected across leads 23 and 34, and the output circuit, consisting of the resistor 46 and the rate limit control windings 47 and 48 of the magnetic amplifier VCM, is connected across leads 23 and 44.

The outputs of the magnetic amplifiers ARM and DRM depends, of course, on the control windings used with these amplifiers. Magnetic amplifier ARM has bias windings 50 and 51 connected in series with the rate adjusting rheostat 49, connected across leads P and N, and magnetic amplifier DRM has bias windings 53 and 54, connected in series with the rate adjusting rheostat 52, connected across leads P and N.

These two magnetic amplifiers are also each provided with anti-hunt windings, pattern windings, damping windings, generator voltage responsive windings, and rate windings.

The anti-hunt windings 56 and 57, and 58 and 59 are connected in series with resistor 55 and this circuit is connected directly across leads 23 and 34. The pattern windings 60 and 61, and 62 and 63 are, through run switch SW and tap T on potentiometer PT connected to leads P and N. The damping windings 64 and 65, and 66 and 67 are connected in a loop circuit including the conductor 68, the damping windings 69 and 70 on magnetic amplifier VCM and the reactor 71 and resistor 72. The voltage windings 73 and 74, and 75 and 76 are connected to the armature output leads of the generator G. The rate windings 77 and 78, and 79 and 80 are connected in a loop circuit including the flux field FF of the generator G.

During acceleration the voltage of the generator is rising at a rapid rate, dependent, of course, on the rate of acceleration. As shown, a rate signal is thus obtained from the flux field FF on the variable voltage generator. The rise of a flux field is the most desirable means of obtaining a rate signal since it provides a high gain signal which is in phase with the rate of change of the generator voltage.

The rate signal could also be obtained by the use of a transformer or an RC circuit across the generator armature terminals, however, with this suggested type of circuitry it would not be possible to obtain the same gain without the use of large components and an additional time delay would be introduced into the rate limit circuit.

Figure 6:
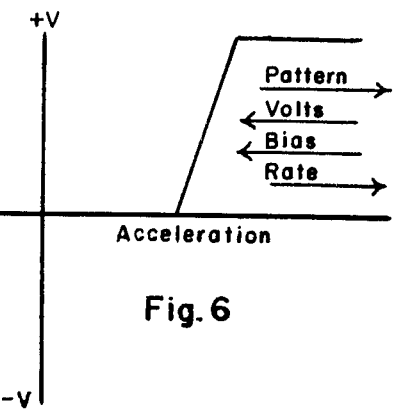

When the rate signal obtained from the flux field sufficiently energizes the rate windings 77 and 78, assuming acceleration, to overcome or exceed the selected bias signal from windings 50 and 51, then the output of magnetic amplifier ARM is increased. This is illustrated by the rate and bias arrows shown under acceleration in FIG. 6. During this same time the output of magnetic amplifier DRM is decreased since this same signal on windings 79 and 80 will be in an opposite sense with respect to windings 53 and 54. The rate limit magnetic amplifiers will thus provide a signal, through windings 47 and 48, on the voltage control magnetic amplifier VCM, and therefore, lower the rate of change, namely rise of the generator voltage. In order to maintain the rate constant when the rate limit magnetic amplifiers are functioning, the pattern windings 60 and 61, and 62 and 63 and the generator voltage responsive windings 73 and 74, and 75 and 76 are used on the rate limit magnetic amplifiers, and the error between these two groups of fields on the respective magnetic amplifiers provides a signal to give an additional output of the rate limit magnetic amplifiers ARM and DRM.

During deceleration the signal from the flux field FF is in an opposite sense and the total result is that the voltage control magnetic amplifier again lowers the rate of change, namely lowering of the generator voltage.

The RC circuit connected around the pattern windings 10 and 11 of the voltage control, or regulating, magnetic amplifier VCM is to slow the initial response of the voltage regulator to a step input to give the rate limit magnetic amplifier means time to function to eliminate any step change in the voltage on the generator before the rate limit magnetic amplifier means can operate. However, this does not slow the response of the regulator to a load disturbance and for any variation load the regulator will function in its normal manner.

This control in addition to providing the operator with a means of determining the final operating point of the drive, also provides means, namely rheostats 49 and 52, to independently adjust the acceleration and deceleration rates. It should be noted that these rates are held constant throughout the acceleration and deceleration periods. This linear acceleration rate is required to permit the correct functioning of the current regulators of the drive.

Figure 2:
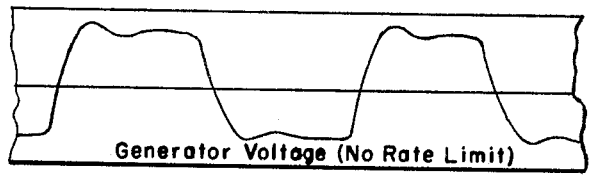
FIG. 2 shows a recorded curve illustrating the response of the generator voltage regulator without the use of the novel features of the control system herein disclosed.

In FIG. 2 the voltage variations of the generator G, as the curve is recorded on the sheet of a recording instrument, are shown when the voltage regulating feature of the control is not provided with the rate limiting feature. In short the curve shown in FIG. 2 shows the generator voltage variations when the control windings 47 and 48 on magnetic amplifier VCM are not used.

Figure 3:
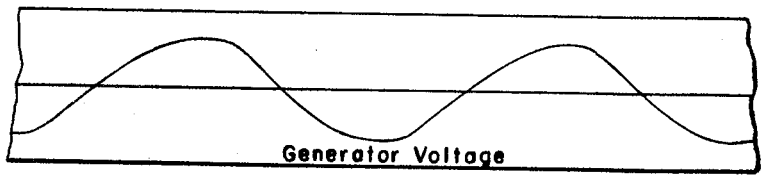
FIG. 3 shows recorded curves illustrating the novel functions of this invention for particular accelerating and decelerating rates.
Figure 3:
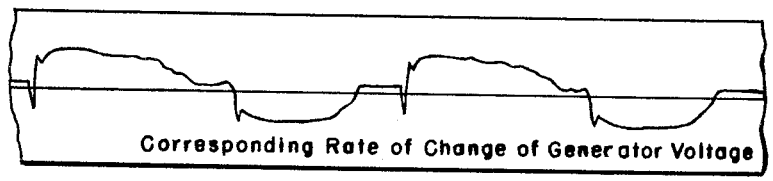

In FIG. 3 the upper curve shows the generator voltage variations with the rate limiting control. It will be noted that the rate of change is held constant and the acceleration period requires approximately six seconds and the deceleration period requires approximately five seconds. However, these accelerating and decelerating time periods can be adjusted independently by the rheostats 49 and 52. The lower curve in FIG. 3 is a showing of the signal from the flux field winding FF of the generator G and its magnitude is proportional to the rate of change of generator voltage. It will be noted that this value is held constant throughout the major portion of the acceleration and deceleration periods.

Figure 4:
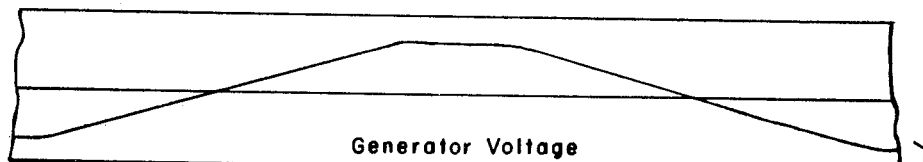
FIG. 4 is a showing similar to the showing in FIG. 3 for other particular accelerating and decelerating rates.
Figure 4:
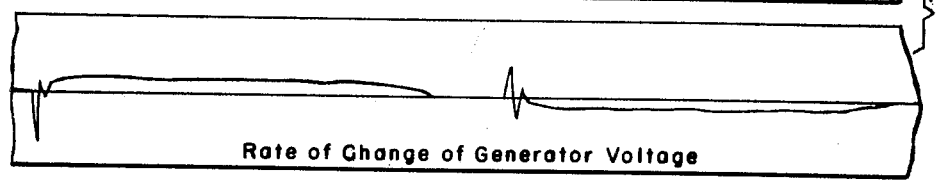
Figure 5:
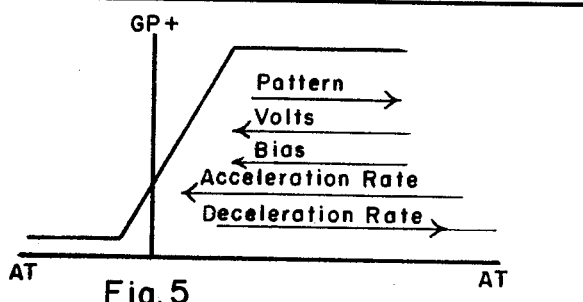
FIGS. 5 and 6 show magnetic amplifier characteristics for the three magnetic amplifiers used in the system of control.

The showing in FIG. 4 is similar to the showing in FIG. 3; however, in this case the curves show the acceleration and deceleration of the generator voltage with an accelerating period that requires approximately 15 seconds and a deceleration period of about the same time period. It will be noted that the response is extremely linear throughout the accelerating and deceleration periods, respectively.

We claim as our invention:

1. In a system of control for a variable voltage drive, in combination, a generator having an armature winding, a main field winding and a second field winding inductively related to the main field winding to thus have an output that is a function of the rate of change of flux produced by the main field winding, a motor excited from a suitable source and having its armature winding connected in a loop circuit with the generator armature winding, an exciter having an armature winding connected in a loop circuit with the main field winding of the generator, a bias field winding, energized from a suitable source, and a regulating field winding, a first magnetic amplifier having main windings, a load resistor connected to be energized by the main winding, means for providing a substantially rippel-free direct current output from the main windings of the magnetic amplifier, and control windings, said control windings including adjustable pattern windings, bias windings, and rate control windings connected in series with the second field winding of the generator and so wound with respect to the other control windings to cause the magnetic amplifier to have an output that is a function of a positive rate of change of the flux produced by the main field winding of the generator, a second similar magnetic amplifier, but wherein the rate control windings are wound in an opposite sense with respect to the other control windings to thus cause the second magnetic amplifier to have an output that is a function of a negative rate of change of flux produced by the main field winding of the generator, and a voltage control magnetic amplifier having main, or output, windings interconnected with the regulating field winding of the exciter, and having control windings, said control windings including one control winding responsive to the differential output of said first two mentioned magnetic amplifiers, and including control windings responsive respectively to the voltages of the exciter and generator.

2. In a system of control for a variable voltage drive, in combination, a generator having an armature winding, a main field winding and a second field winding inductively related to the main field winding to thus have an output that is a function of the rate of change of flux produced by the main field winding, a motor excited from a suitable source and having its armature winding connected in a loop circuit with the generator armature winding, an exciter, having an armature winding connected in a loop circuit with the main field winding of the generator, a bias field winding, energized from a suitable source, and a regulating field winding, a first magnetic amplifier having main windings, a load resistor connected to be energized by the main winding, and control windings, said control windings including adjustable pattern windings, bias windings, rate adjusting means for the bias windings, and rate control windings connected in series with the second field winding of the generator and so wound with respect to the other control windings to cause the magnetic amplifier to have an output that is a function of a positive rate of change of the flux produced by the main field winding of the generator, a second similar magnetic amplifier, but wherein the rate control windings are wound in an opposite sense with respect to the other control windings to thus cause the second magnetic amplifier to have an output that is a function of a negative rate of change of flux produced by the main field winding of the generator, and a voltage control magnetic amplifier having main, or output, windings interconnected with the regulating field winding of the exciter, and having control windings, said control windings including one control winding responsive to the differential output of said first two mentioned magnetic amplifiers, and including control windings responsive respectively to the voltages of the exciter and generator.

3. In a system of control for a variable voltage drive, in combination, a generator having an armature winding, a main field winding and a second field winding inductively related to the main field winding to thus have an output that is a function of the rate of change of flux produced by the main field winding, a motor excited from a suitable source and having its armature winding connected in a loop circuit with the generator armature winding, an exciter, having an armature winding connected in a loop circuit with the main field winding of the generator, a bias field winding, energized from a suitable source, and a regulating field winding, a first magnetic amplifier having main windings, a load resistor connected to be energized by the main winding, means for providing a substantially ripple-free direct current output from the main windings of the magnetic amplifier, and control windings, said control windings including adjustable pattern windings, bias windings, rate adjusting means for the bias windings, and rate control windings connected in series with the second field winding of the generator and so wound with respect to the other control windings to cause the magnetic amplifier to have an output that is a function of a positive rate of change of the flux produced by the main field winding of the generator, a second similar magnetic amplifier, but wherein the rate control windings are wound in an opposite sense with respect to the other control windings to thus cause the second magnetic amplifier to have an output that is a function of a negative rate of change of flux produced by the main field winding of the generator, and a voltage control magnetic amplifier having main, or output, windings interconnected with the regulating field winding of the exciter, and having control windings, said control windings including one control winding responsive to the differential output of said first two mentioned magnetic amplifiers, and including control windings responsive respectively to the voltages of the exciter and generator.

4. In a system of control for a variable voltage drive, in combination, a generator having an armature winding, a main field winding and a second field winding inductively related to the main field winding to thus have an output that is a function of the rate of change of flux produced by the main field winding, a motor excited from a suitable source and having its armature winding connected in a loop circuit with the generator armature winding, an exciter, having an armature winding connected in a loop circuit with the main field winding of the generator, a bias field winding, energized from a suitable source, and a regulating field winding, a first magnetic amplifier having main windings, a load resistor connected to be energized by the main winding, and control windings, said control windings including adjustable pattern windings, bias windings, and rate control windings connected in series with the second field winding of the generator and so wound with respect to the other control windings to cause the magnetic amplifier to have an output that is a function of a positive rate of change of the flux produced by the main field winding of the generator, a second similar magnetic amplifier, but wherein the rate control windings are wound in an opposite sense with respect to the other control windings to thus cause the second magnetic amplifier to have an output that is a function of a negative rate of change of flux produced by the main field winding of the generator, and a voltage control magnetic amplifier having main, or output windings interconnected with the regulating field winding of the exciter, and having control windings, said control windings including one control winding responsive to the differential output of said first two mentioned magnetic amplifiers, and including control windings responsive respectively to the voltages of the exciter and generator.

5. In a system of control for a variable voltage drive, in combination, a generator having an armature winding, a main field winding and a second field winding inductively related to the main field winding to thus have an output that is a function of the rate of change of flux produced by the main field winding, a motor excited from a suitable source and having its armature winding connected in a loop circuit with the generator armature winding, an exciter having an armature winding connected in a loop circuit with the main field winding of the generator, a bias field winding, energized from a suitable source, and a regulating field winding, a first magnetic amplifier having main, or output windings, and control windings, said control windings including, adjustable pattern windings, bias windings, and rate control windings connected in series with the second field winding of the generator and so wound with respect to the other control windings to cause the magnetic amplifier to have an output that is a function of a positive rate of change of the flux produced by the main field winding of the generator, a second similar magnetic amplifier, but wherein the rate control windings are wound in an opposite sense with respect to the other control windings to thus cause the second magnetic amplifier to have an output that is a function of a negative rate of change of flux produced by the main field winding of the generator, and a voltage control magnetic amplifier having main, or output windings interconnected with the regulating field winding of the exciter, and having control windings, said control windings including one control winding responsive to the differential output of said first two mentioned magnetic amplifiers, and including control windings responsive respectively to the voltages of the exciter and generator.

References Cited in the file of this patent

UNITED STATES PATENTS

| | | |
|---|---|---|
| 2,677,097 | Carleton | Apr. 27, 1954 |
| 2,785,360 | Abell et al. | Mar. 12, 1957 |
| 2,785,361 | Schaelchlin et al. | Mar. 12, 1957 |
| 2,785,359 | King et al. | Mar. 12, 1957 |

FOREIGN PATENTS

| | | |
|---|---|---|
| 144,846 | Australia | Jan. 24, 1952 |
| 653,444 | Great Britain | May 16, 1951 |